United States Patent
Smith

(10) Patent No.: US 9,022,687 B2
(45) Date of Patent: May 5, 2015

(54) SYSTEMS AND METHODS FOR CREATING GRAVEL BARS

(71) Applicant: Sean Warren Smith, Oakdale, CA (US)

(72) Inventor: Sean Warren Smith, Oakdale, CA (US)

(*) Notice: Subject to any disclaimer, the term of this patent is extended or adjusted under 35 U.S.C. 154(b) by 0 days.

(21) Appl. No.: 14/046,952

(22) Filed: Oct. 5, 2013

(65) Prior Publication Data

US 2015/0098764 A1 Apr. 9, 2015

(51) Int. Cl.
*E02F 5/22* (2006.01)
*E02F 1/00* (2006.01)
*E02B 3/00* (2006.01)
*E02B 3/02* (2006.01)

(52) U.S. Cl.
CPC ... *E02F 5/22* (2013.01); *E02F 1/00* (2013.01); *E02B 3/00* (2013.01); *E02B 3/02* (2013.01)

(58) Field of Classification Search
CPC ............ E02B 7/06; E02D 17/18; E02F 5/22; E02F 5/226; E02F 5/24
USPC ................................................. 405/116, 117
See application file for complete search history.

(56) References Cited

U.S. PATENT DOCUMENTS

| | | | |
|---|---|---|---|
| 2,757,514 A * | 8/1956 | Wyatt | 405/117 |
| 6,002,063 A * | 12/1999 | Bilak et al. | 588/17 |
| 6,502,333 B1 * | 1/2003 | Striegel | 37/142.5 |
| 6,820,358 B1 * | 11/2004 | Huelsewiesche | 37/407 |
| 6,863,807 B2 * | 3/2005 | Crawford, III | 210/170.09 |
| 7,585,135 B1 * | 9/2009 | Deal, Jr. | 405/258.1 |
| 8,366,349 B2 * | 2/2013 | Beachner | 405/129.35 |
| 2007/0196178 A1 * | 8/2007 | Sweningson | 405/107 |
| 2007/0260379 A1 * | 11/2007 | Congdon | 701/50 |

* cited by examiner

*Primary Examiner* — Benjamin Fiorello
(74) *Attorney, Agent, or Firm* — Steven A. Nielsen; www.NielsenPatents.com

(57) ABSTRACT

A system and method for creating sand bars or gravel bars in fresh water includes the use of a hopper to mix pressurized water and gavel to create slurry. The slurry is discharged by a worker in the water so as to make a gravel bar or other structure to help restore wild life. A new hopper 100 may comprise a top box section 120, the top box section having an upper end attached to a grate system 110, a pair of lateral spill shields 115 and a rear spill shield 117; and the top box section may have a lower end attached to a funnel assembly 130; the funnel assembly may comprise a top section 132 and a constrained lower section 135, the constrained lower section may comprise a plurality of inside angled lower edges 137 all terminating within a section of an angled hopper pipe 140.

16 Claims, 15 Drawing Sheets

US 9,022,687 B2

SYSTEMS AND METHODS FOR CREATING GRAVEL BARS

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

Field of the Invention

The invention generally relates to methods and systems to deposit gravel into waterways and rivers. More particularity, disclosed embodiments relate to a new hopper system and related components used to place gravel or rock within waterways and rivers to construct sand bars or other structures.

BRIEF SUMMARY OF THE INVENTION

A bar in a river is an elevated region of sediment (such as sand or gravel) that has been deposited by the flow or current of a river. Types of bars include mid-channel bars (also called braid bars, and common in braided rivers), point bars (common in meandering rivers), and mouth bars (common in river deltas). Bars are typically found in the slowest moving, shallowest parts of rivers and streams, and are often parallel to the shore and occupy the area farthest from the deepest portion of the channel.

The locations of gravel bars in waterways are usually determined by the geometry of the river and the flow through it. Point bars form on the inside of meander bends in a meandering river because the shallow flow and low shear stresses there reduce the amount of material that can be carried there. The excess material falls out of transport and forms the bar.

Problems arise when sediment is held back by dams or other obstructions, resulting in losses of habitat for fish and other aquatic wildlife, such as riffle-pool sequences and gravel bars. Restoring gravel bars downstream from dams is an important way to improve physiological, ecological, and thermal diversity in rivers. Having these diverse rivers is important for fish, such as salmon, which require different types of habitat during various life stages. Gravel bars are also believed to function as 'natural filters' for particulate organic matter, nutrients, and plankton. Retaining this organic matter helps purify the river and provide primary energy resources to the river ecosystem.

Gravel is a highly mobile material which erodes in some areas and deposits in others. River gravel comprises a mixture of particles larger than sand (greater than 2 mm in diameter) but smaller than boulders (typically less than 256 mm in diameter).

Natural gravel movements create a varied river channel with deep pools, shallows and exposed accumulations of gravel. These in turn create various types of flow and so provide a mosaic of habitats for fish and other species under normal, drought and flood conditions.

Gravel provides a habitat on and within which many aquatic organisms complete one or more stages of their life cycle, and is used by them to escape hostile flood waters. Exposed accumulations of gravel are important as havens for a range of terrestrial plants and animals.

There have been efforts to ameliorate the damage to these waterways by replacing gravel deposits in rivers. However, to date these efforts have typically required large machinery and well developed roadways and access to the waterway. Unfortunately, many of the rivers damaged by dams are remote and difficult to reach with heavy machinery.

The present invention overcomes shortfalls in the related art by presenting a unique and unobvious combination, configuration and use of smaller machinery that requires less infrastructure to bring to bear on the problem. As such, this invention can be used in more remote areas, and at a fraction of the cost of existing techniques.

REFERENCE NUMERALS IN THE DRAWINGS

Figure 1:
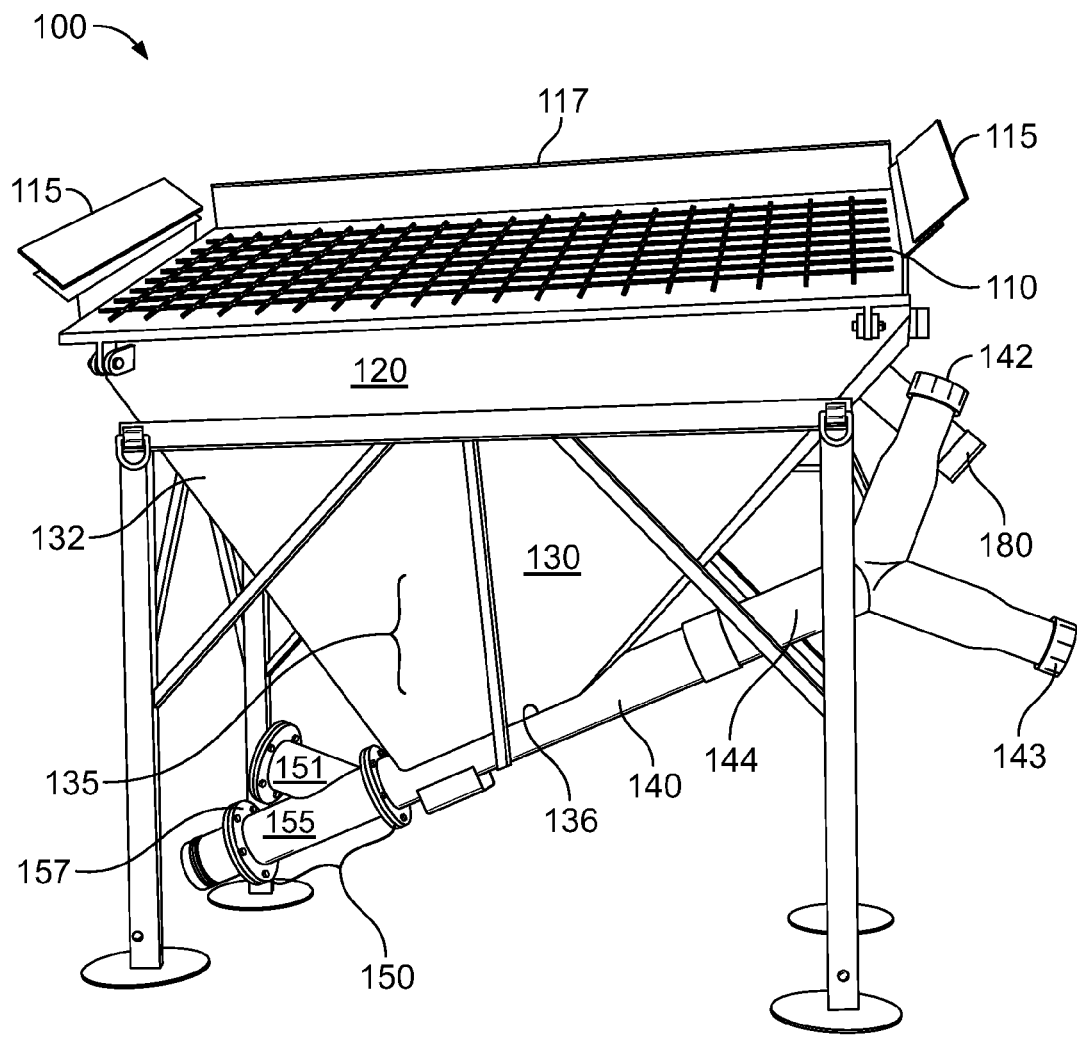
FIG. 1 depicts a disclosed hopper system

100 a hopper in general
110 a grate system of a hopper 100
115 lateral spill shields of a hopper 100
117 rear spill shield of a hopper 100
120 top box section of a hopper 100
130 a funnel assembly of a hopper 100
132 top section of a funnel assembly 130
135 a constrained lower section of a funnel assembly 100
136 angled line of intersection between the embedded section of the angled hopper pipe 140 and the constrained lower section of the funnel assembly
137 inside angled lower edges of a constrained lower section 135 of a funnel assembly 130
140 angled hopper pipe connected at angled lower edge 137 of a constrained lower section 135 of a funnel assembly 100
141 inside section of angled hopper pipe
142 an upper input pipe
143 a lower input pipe
144 a confluence pipe section
145 a water input pipe of a single line input system
146 a quick shut off value of a water input pipe 145
150 a clean out assembly
151 a clean out pipe of a clean out assembly 150
152 pivot cap attached to clean out pipe 151
155 a main pipe of a clean out assembly 150
157 flange connection a slurry transport pipe 160 vibrator attached to a rock hopper 100
170 quick shut off valve
180 overflow opening or overflow line
185 quick shut off valve at overflow line 180
242 a water input hose in connection with upper input pipe 142
243 water input hose in connection with lower input pipe 143
250 a slurry output pipe in connection with a clean out assembly 150
300 tractor
305 bucket of tractor dumping material into the hopper
400 a first portable water pump
405 a second portable water pump
420 a water input hose supplying water to a second portable water pump 405
430 a water input hose supplying water to a first portable water pump 400
243 a water hose connected to a rock hopper and a pump
500 dump truck
505 bed of dump truck
600 gravel
610 gravel material too large to pass through the grate system 110
700 river
800 slurry
900 buoyancy device These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

FIG. 1 depicts in general a disclosed rock hopper 100 comprising a grate system 110 covering the top of the rock hopper. The grate system may comprise a filter blocking material or rocks sized larger than suitable for the apparatus and/or the intended use of the output slurry.

Figure 10:
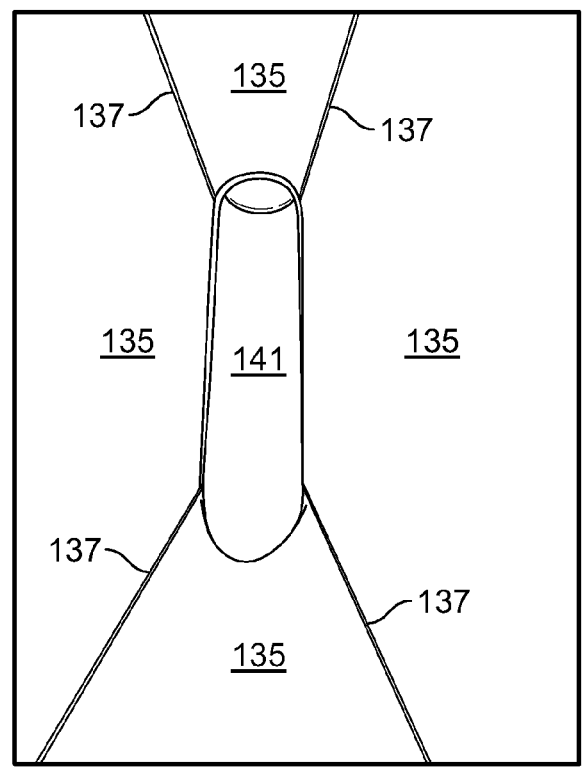
FIG. 10 depicts the inside bottom void of a hopper funnel or hopper container

A pair of lateral spill shields 115 are shown on either side of the top box section 120 of the hopper. A rear spill shield 117 is attached to the rear of the top box section 120. The top box section 120 is attached to a funnel assembly 130, the funnel assembly tapering down into a section of angled hopper pipe 140. As shown in FIG. 10, a constrained section 135 or area of the funnel assembly may comprise angled lower edges 137, all leading to the interior 141 of an angled hopper pipe 140.

The artful combination of the angled lower edges 137 configured to terminate within an inside section or interior section 141 of an angled hopper pipe achieves excellent results in preventing system blockage and obtaining an optimal mixture of rock and water, the combination sometimes referred to as slurry. The disclosed configuration of the funnel assembly is unusual in that the contents of the entire top box section is funneled or constrained down to the width and length of an angled hopper pipe.

The use of an angled hopper pipe 140 achieves excellent results by providing the correct downhill inertia to allow gravel to flow down the angled hopper pipe 140.

In the best mode known to date, the angled hopper pipe is set at an angle of 23 degrees. The angled hopper pipe 140 may be set in a range of 10 to 40 degrees. For most applications, a range of 15 to 35 degrees works well. Angle is measured from horizontal.

The upper end of the angled hopper pipe may be connected to a confluence pipe section 144 which in turn may be connected to one or more input pipes, such as an upper input pipe 142 and a lower input pipe 143. The input pipes may supply water from pumps and direct the water into the angled hopper pipe for mixing with gravel within the angled lower edges 137, see FIG. 10, of the constrained lower section 135 of the funnel assembly.

A lower end of the angled hopper pipe 140 may be attached to a clean out assembly 150, the clean out assembly may comprise a main pipe 155, a clean out pipe 151, having a pivot cap 152 and a lower valve section 157. The artful combination of the clean out assembly 150, angled hopper pipe and constrained funnel assembly 130 provides excellent and unexpected results in quickly unclogging stoppages during field use. Upon a stoppage or other emergency, the lower valve section may be closed via a quick shut off valve, shown in FIGS. 11 and 12, the pivot cap 152 may be opened an a worker may place a bar or other tool to dislodge blocking material lodged within the angled hopper pipe. Excess water may be released via an overflow valve our outlet 180 found at or near the top box section 120 of the hopper.

Figure 2:
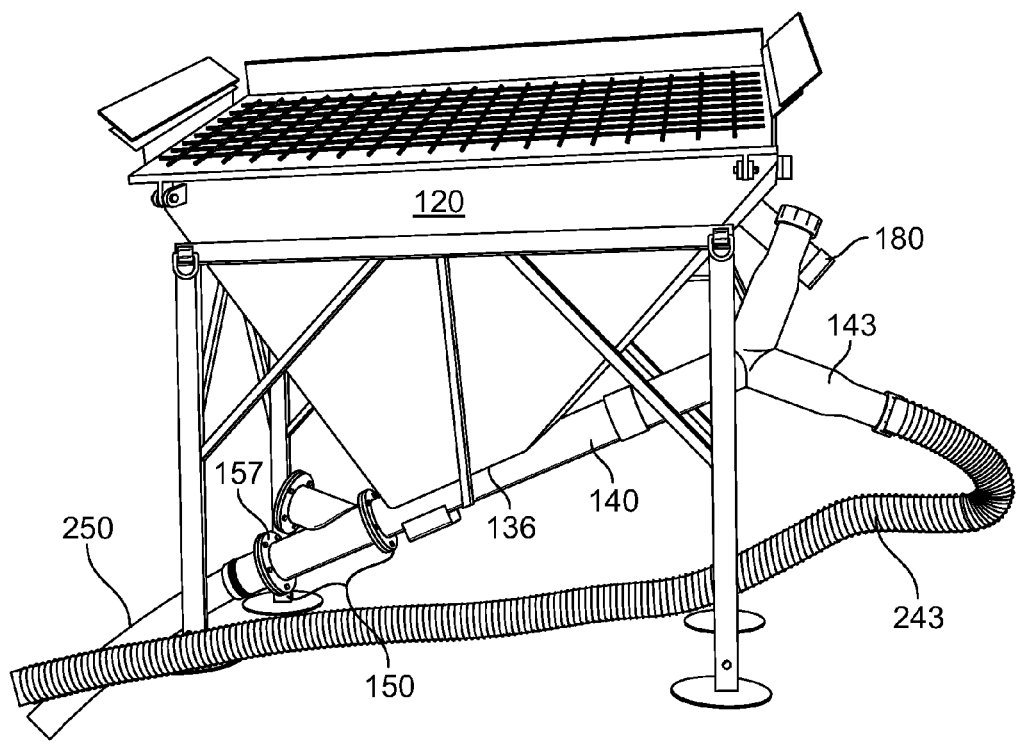
FIG. 2 depicts a disclosed hopper system with an input hose attached

FIG. 2 is similar to FIG. 1 but also depicts a water hose 243 used to supply water to the angled hopper pipe. The opposite end of the water hose may be connected to a water pump.

Figure 3:
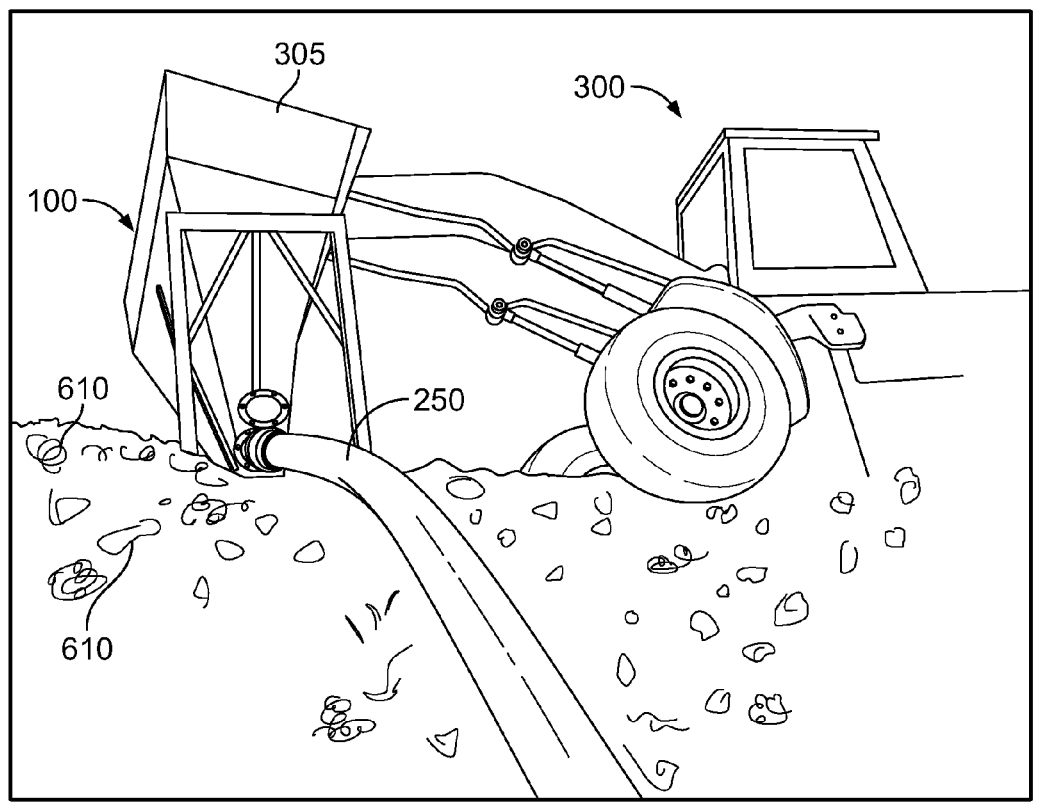
FIG. 3 depicts a tractor depositing gravel into a hopper

FIG. 3 depicts a tractor 300 using a bucket 305 to load gravel into a hopper 100. A slurry output pipe or hose 250 is shown running downhill to a river or other area in need of slurry. The foreground of FIG. 3 shows pieces of large gravel 610 that were too large to pass though the grate system of the hopper. FIG. 3 depicts the downhill side of FIG. 8.

Figure 4:
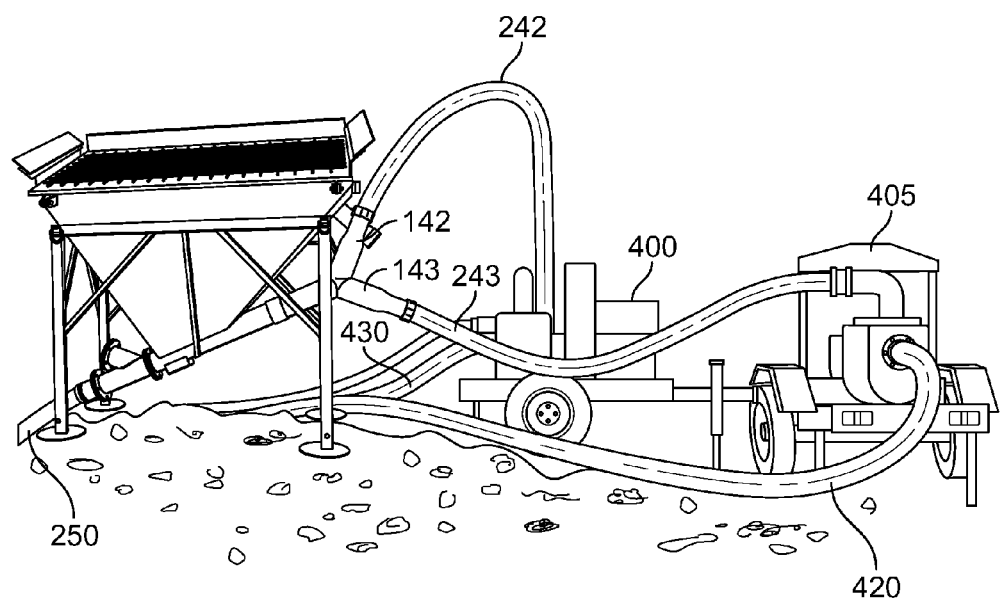
FIG. 4 depicts a hopper, water pumps, and water pipes

FIG. 4 depicts a first portable water pump 400 and a second portable water pump 405 supplying water to an upper input pipe 142 and a lower input pipe 143. Water is shown to reach the two pumps by water input hoses 420 and 430.

Figure 5:
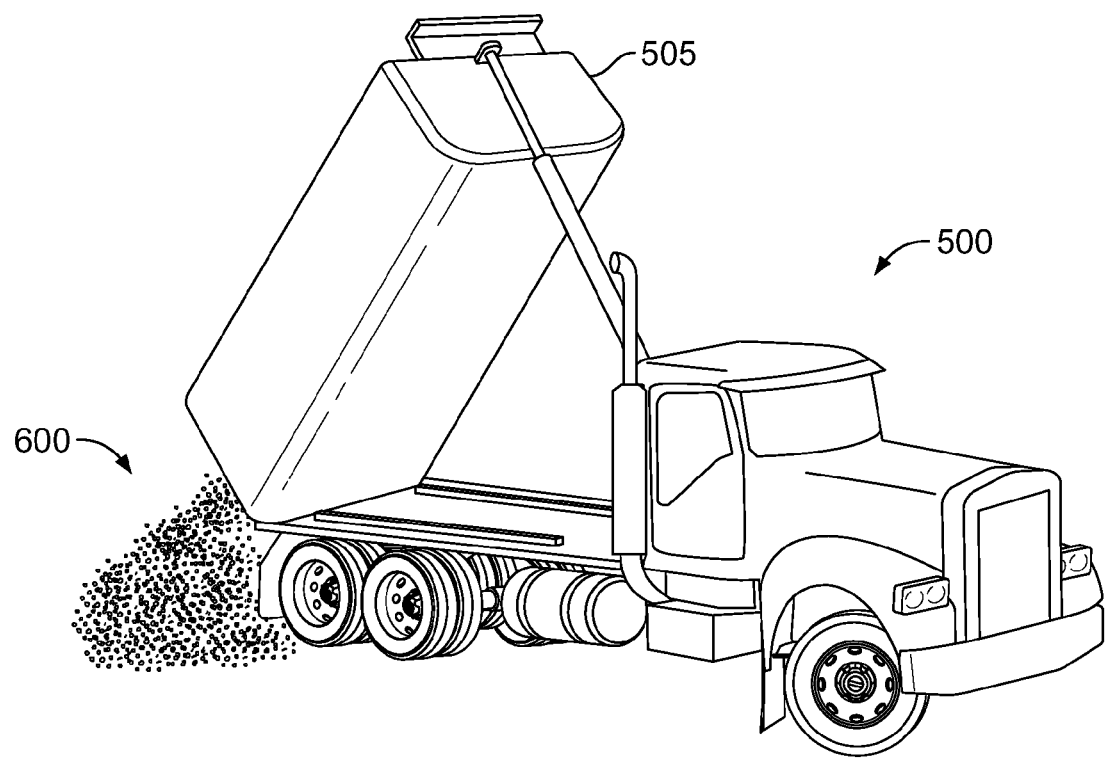
FIG. 5 depicts a truck dumping gravel

FIG. 5 depicts a dump truck 500 using a bed 505 to pour gravel 600 into a pile. Such a truck may bring in gravel or other material from off site. The gravel may be placed near a hopper. A tractor or other implement may be used to load the gravel into the hopper. When the road/infrastructure allows, large deposits of gravel can be brought in to a location near the waterway. Proximity to the waterway is beneficial since it reduces the length of piping required to transport material to or from the waterway. Also, it is preferable to locate the gravel pile at an elevated location to the waterway in need of slurry, to reduce the energy needed to transport the slurry to the waterway.

Figure 6:
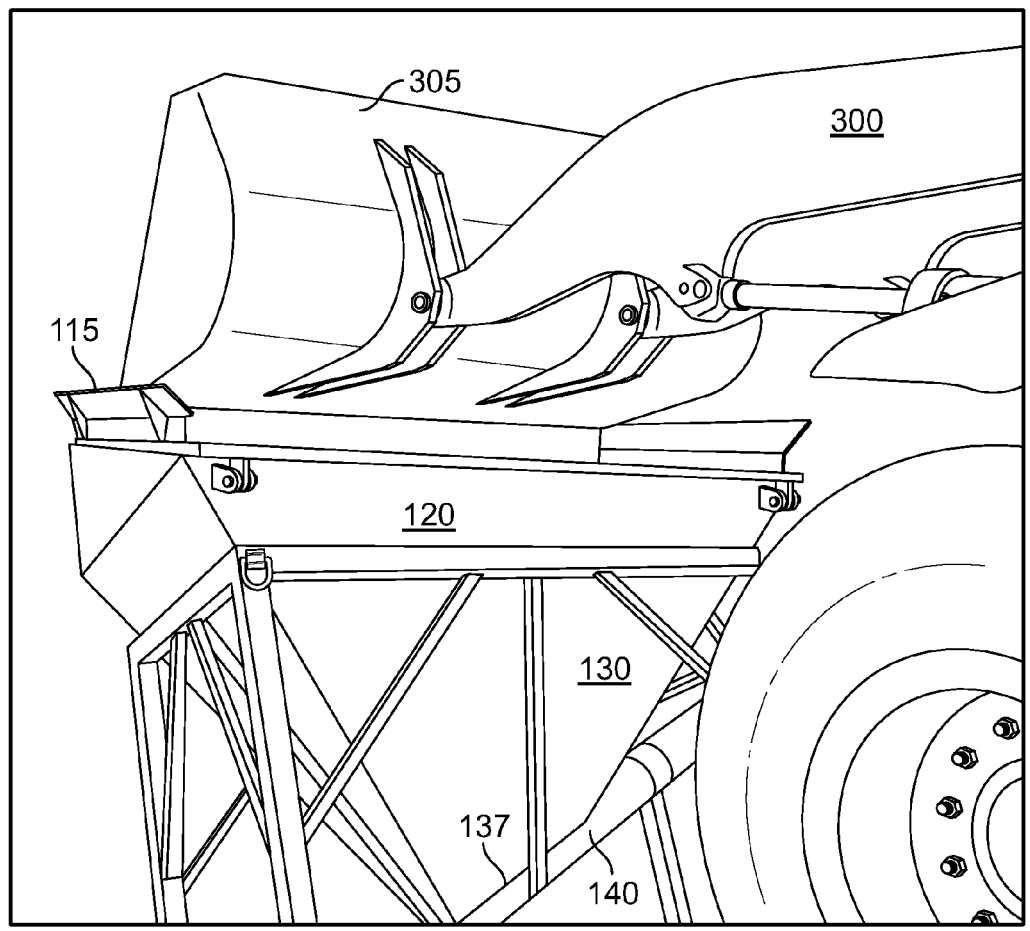
FIG. 6 depicts a tractor depositing gravel into a hopper

FIG. 6 depicts a tractor 300 using a bucket 305 to place gravel in a rock hopper 100. Slurry may be produced while gravel is placed in the hopper and while water is passed though the angled hopper pipe 140.

Figure 7:
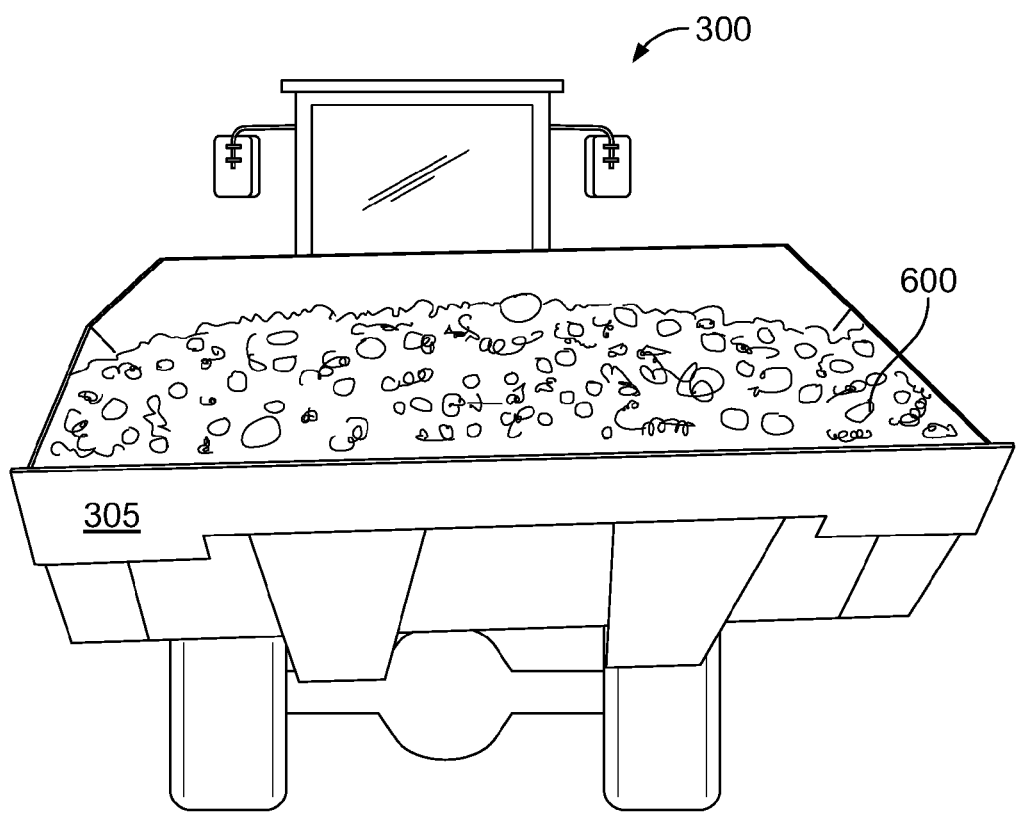
FIG. 7 depicts a tractor transporting gravel

FIG. 7 depicts a tractor 300 using a bucket 300 to transport gravel 300 to a rock hopper. The bucket 305 allows the tractor 300 to pick up gravel left by a dump truck.

Figure 8:
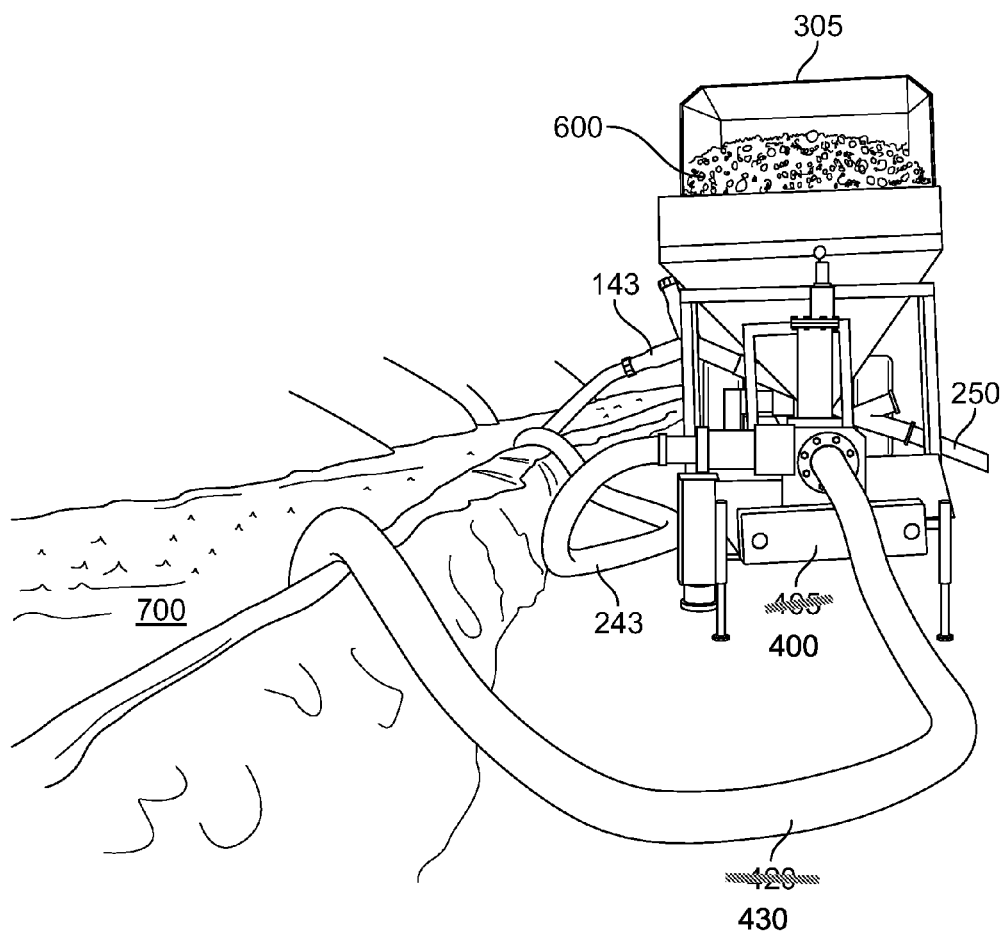
FIG. 8 depicts a water pump, hopper and water lines adjacent to an irrigation canal or other water source

FIG. 8 depicts a hopper receiving water from an aqueduct or irrigation canal 700 and sending slurry downhill through a slurry output pipe. FIG. 8 also depicts a tractor bucket 305 dumping gravel into the top of a hopper. The downhill side of FIG. 8 is shown in FIG. 3.

Figure 9:
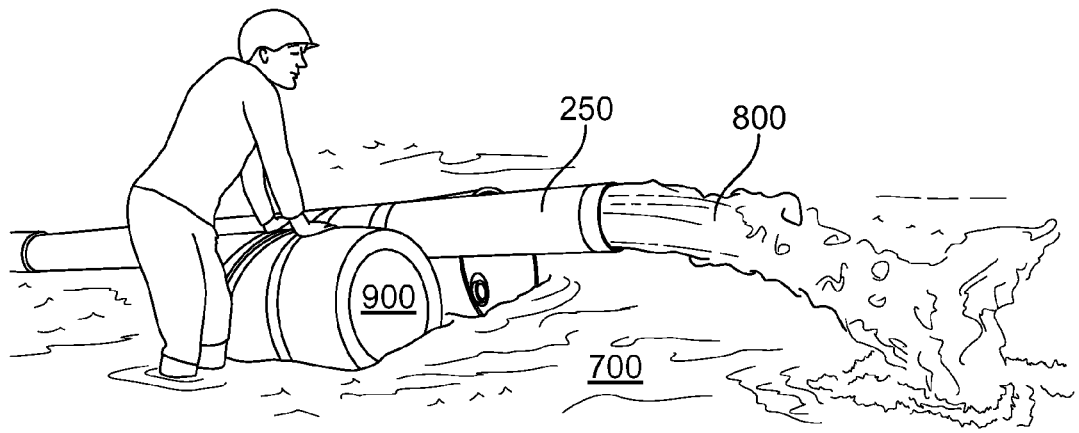
FIG. 9 depicts slurry ejected into a river, as directed by an operator

FIG. 9 depicts a worker directing a slurry output pipe 250 to dispense slurry 800 into a river 700. The slurry output pipe 250 is supported upon the river by use of a buoyancy device. The worker is able to control the placement of slurry to create a sand or gravel bar or other desired structure.

FIG. 10 depicts the lower inside architecture or constrained lower section 135 of a funnel system of a hopper. Four angled lower edges 137 are shown to terminate within the inside section 141 of an angled hopper pipe. This configuration provides excellent results in preventing clogs while supplying an excellent mixture of water and gravel to create the desired slurry. The disclosed configuration keeps all gravel in direct alignment with the inside section 141 of an angled hopper pipe and keeps all gravel in a position of potential energy with respect to the angled hopper pipe. The open inside section 141 of the angled hopper pipe is also close to the clean out pipe of FIG. 13 and thus allows for tools to reach the inside pipe section 141 to directly dislodge trapped gravel material.

Figure 11:
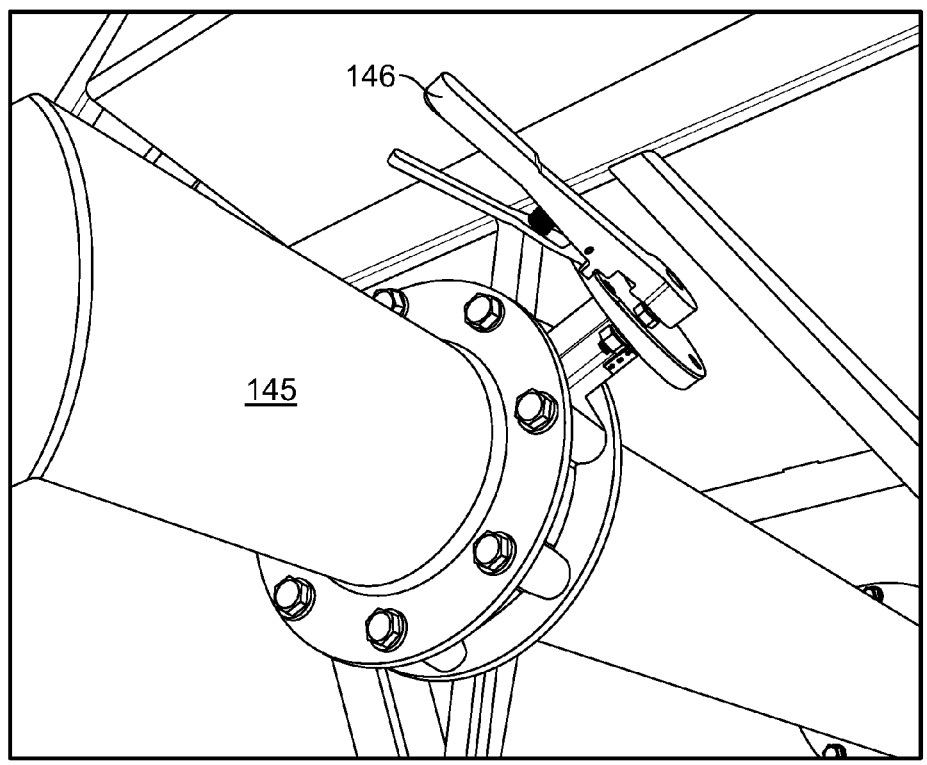
FIG. 11 depicts single pump import pipe with valve
Figure 16:
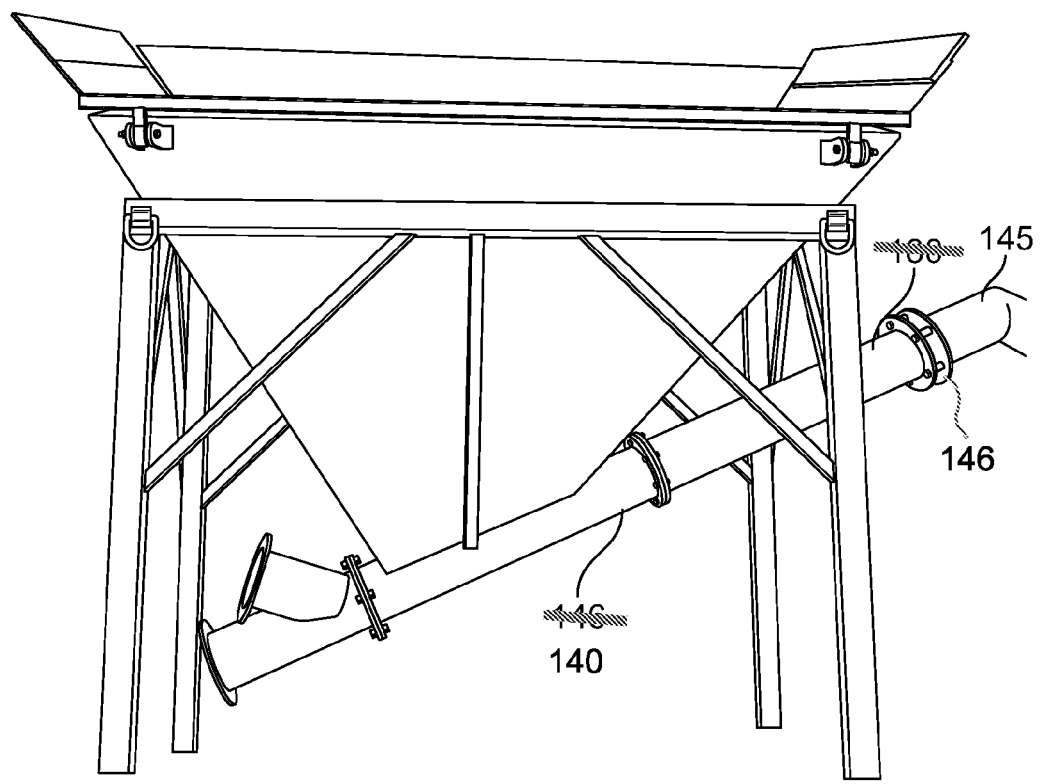
FIG. 16 depicts a perspective view of a single water line embodiment

FIG. 11 depicts a shut off valve 146 at the primary water input pipe 145 in the single pump/supply line method or version. During field use, there is sometimes a need to quickly shut off the supply of slurry so that a worker may use the clean out pipe to clear the inside section of an angled hopper pipe. FIG. 11 depicts a single input line configuration wherein FIG. 1 depicts a two input line system. The general operation of the invention is the same in either version. FIG. 16 shows the single water line input embodiment.

Figure 12:
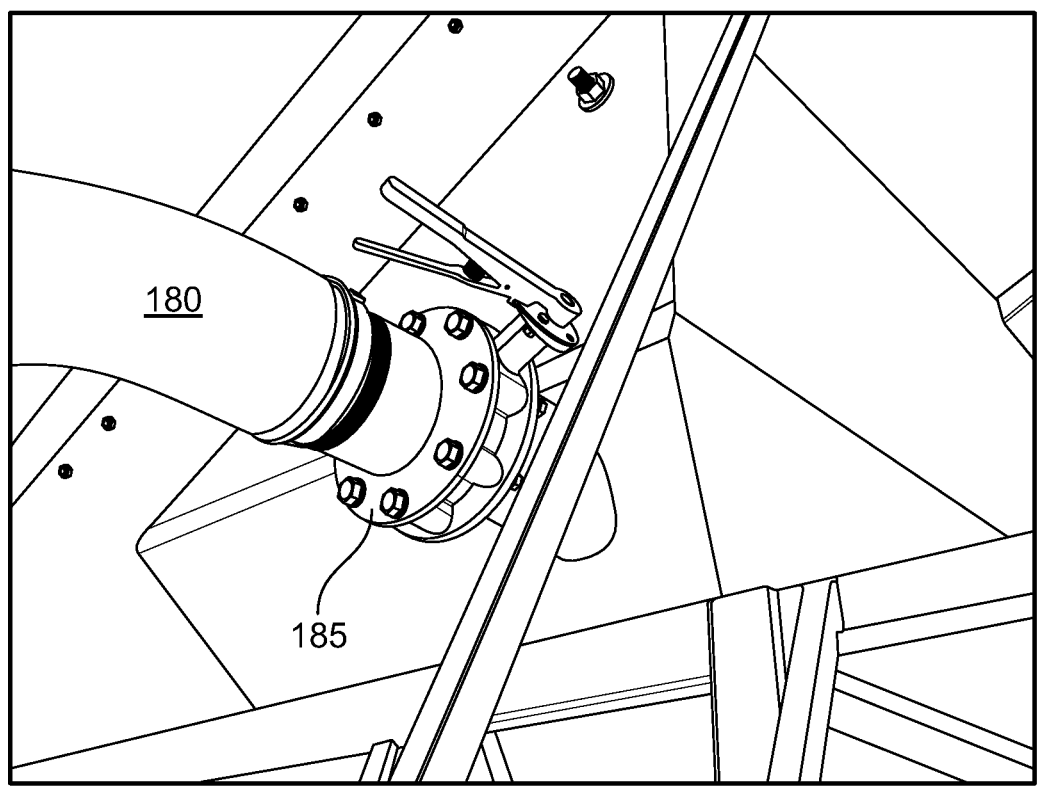
FIG. 12 depicts an overflow pipe with valve

FIG. 12 depicts an overflow line 180 and a quick shut off valve.

Figure 13:
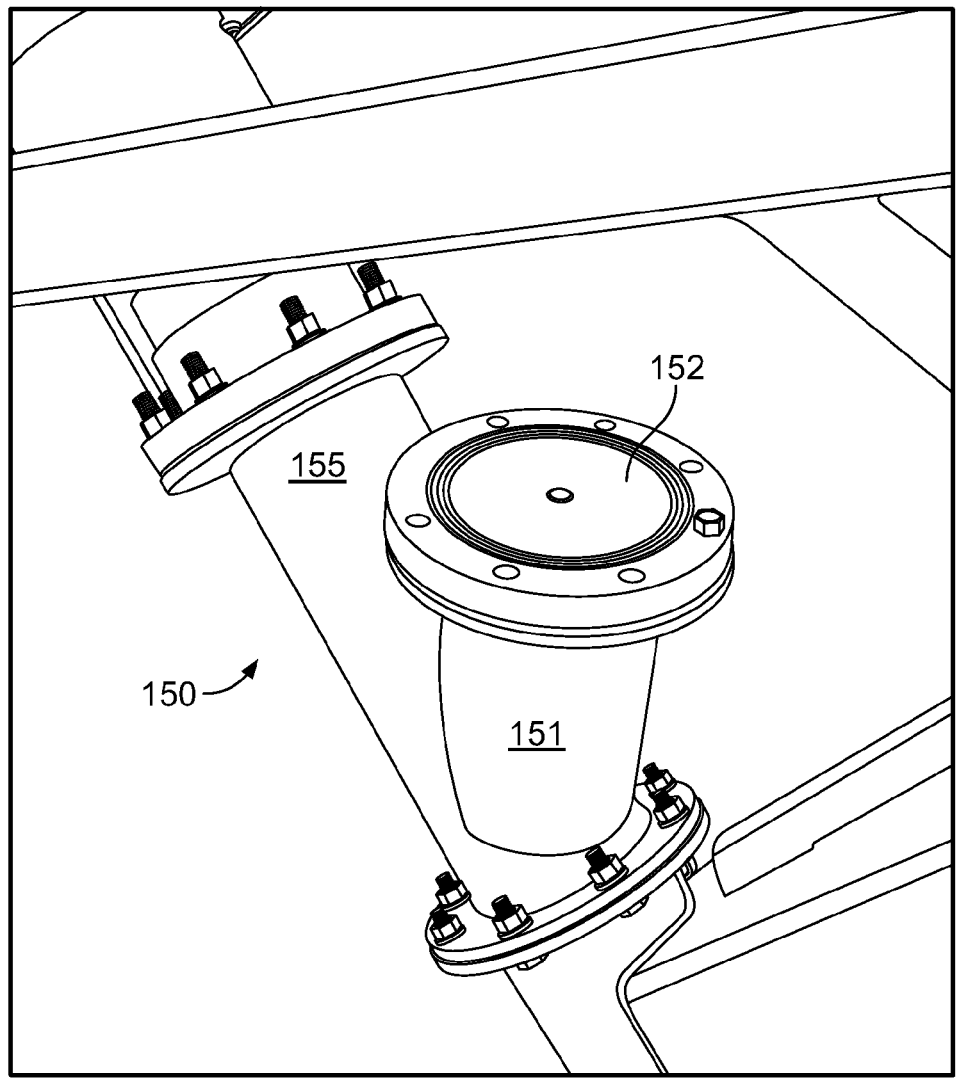
FIG. 13 depicts a clean out pipe

FIG. 13 depicts an expanded view of a clean out assembly 150 comprising a main pipe 155 and clean out pipe 151 having a pivot cap 152.

Figure 14:
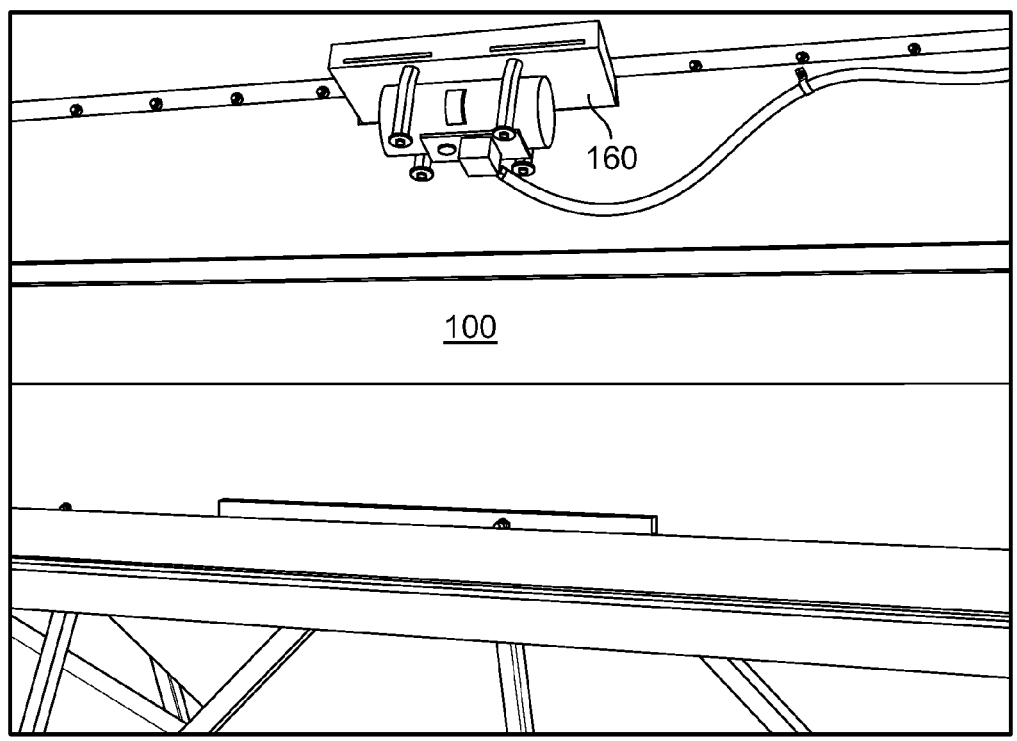
FIG. 14 depicts a vibration machine attached to the rock hopper vibrating the screen assembly

FIG. 14 depicts a vibrator 160 or other agitating device attached to a hopper. A vibrator or other implement may be used to shake the hopper's screen deck assembly during the loading of gravel. Such shaking may help to keep out material that is larger than the grid on the grate system 110, see FIG. 1.

Figure 15:
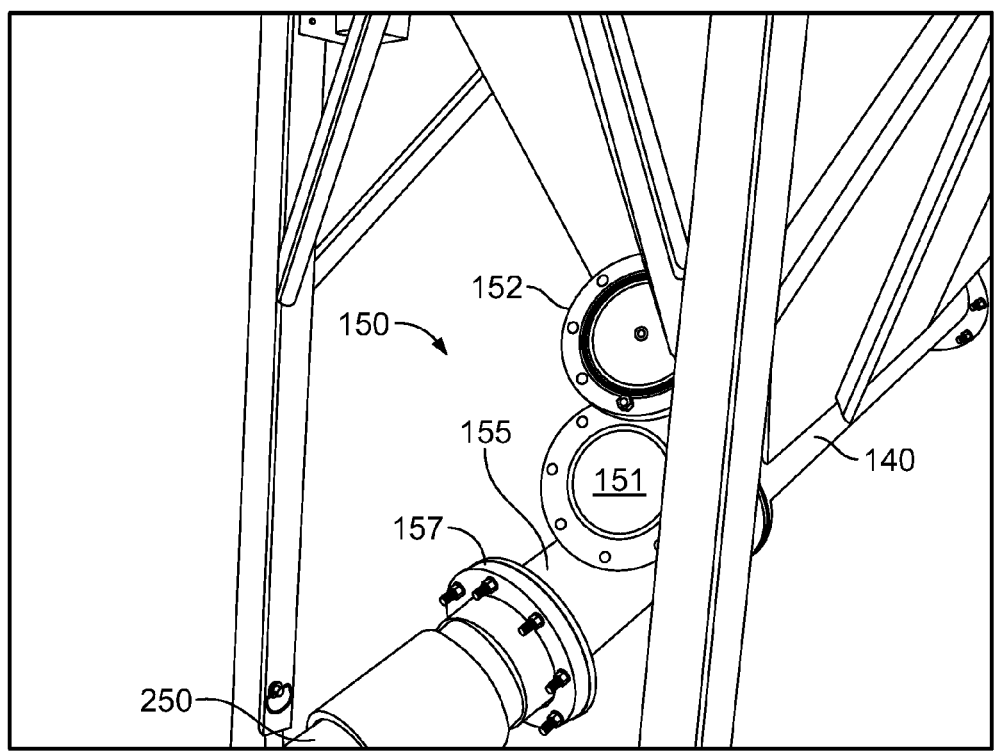
FIG. 15 depicts a clean out pipe in an open position

FIG. 15 discloses an angled hopper pipe 140 buried half way into a funnel assembly of a hopper. Such a configuration places gravel directly into the angled hopper pipe and assists in quick clearing by use of the adjacent clean out assembly.

FIG. 15 also depicts a clean out assembly 150 comprising a main pipe 155, a clean out pipe 151 and an opened pivot cap 152.

FIG. 16 depicts a single water line embodiment having a single input line 145 for the introduction of water. The single input line as a shutoff valve 146. An overflow line 180 is shown with a shutoff valve 185.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A system for creating gravel bars in bodies of water, the system comprising:
    a hopper comprising a top box section, the top box section having an upper end attached to a grate system, a pair of lateral spill shields and a rear spill shield;
    and the top box section having a lower end attached to a funnel assembly;
    the funnel assembly comprising a top section and a constrained lower section, the constrained lower section comprising a plurality of inside angled lower edges all terminating within a section of an angled hopper pipe;
    the angled hopper pipe set at an angle of between 10 to 40 degrees from horizontal and the angled hopper pipe having a first end attached to a clean out assembly, the clean out assembly comprising a main pipe, a clean out pipe with the clean out pipe attached to a pivot cap;
    an inflow of gravel placed in the hopper;
    an outflow of gravel from the main pipe.

2. The system of claim 1 further comprising a single water input pipe attached to a second end of the angled hopper pipe.

3. The system of claim 1 further comprising an upper input pipe and a lower input pipe attached to a confluence pipe section, the confluence pipe section attached to a second end of the angled hopper pipe.

4. The system of claim 3 further comprising a water input hose having a first end attached to the upper input pipe and having a second end attached to a water pump, the water pump attached to a supply hose with the distal end of the supply hose in a water supply.

5. The system of claim 1 further comprising a slurry output hose attached to the main pipe.

6. The system of claim 5 further comprising a buoyancy device attached to a distal end of the slurry output pipe.

7. The system of claim 1 further comprising a vibrator attached to the hopper.

8. A method of building gravel bars and other structures in water, the method comprising the steps of:
    using a hopper to accept gravel, the hopper comprising a top box section, the top box section having an upper end attached to a grate system, a pair of lateral spill shields and a rear spill shield;

and the top box section having a lower end attached to a funnel assembly;

using the funnel assembly to accept gravel from the hopper, the funnel assembly comprising a top section and a constrained lower section, the constrained lower section comprising a plurality of inside angled lower edges all terminating within a section of an angled hopper pipe;

using the angled hopper pipe to accept gravel from the funnel assembly, the angled hopper pipe set at an angle of between 10 to 40 degrees from horizontal and the angled hopper pipe having a first end attached to a clean out assembly, the clean out assembly comprising a main pipe, a clean out pipe, with the clean out pipe attached to a pivot cap;

placing gravel into the hopper;

forming a gravel bar from gravel expelled from the main pipe.

9. The method of claim 8 further comprising the use of a single input pipe attached to an end of the angled hopper pipe.

10. The method of claim 8 further comprising the use of an upper input pipe and a lower input pipe attached to a confluence pipe section, the confluence pipe section attached to a second end of the angled hopper pipe.

11. The method of claim 10 further comprising a water input hose having a first end attached to the upper input pipe and having a second end attached to a water pump, the water pump attached to a supply hose with the distal end of the supply hose in a water supply.

12. The method of claim 8 further comprising the use of a slurry output pipe attached to the main pipe.

13. The method of claim 12 further comprising the use of a buoyancy device attached to a distal end of the slurry output pipe.

14. The method of claim 8 further comprising the use of a vibrator attached to the hopper.

15. The method of claim 14 further comprising the use of gravel in the hopper and water flowing into the angled hopper pipe.

16. A kit for building gravel bars, sand bars or other structures in fresh water, the kit comprising:

a hopper used to accept gravel, the hopper comprising a top box section, the top box section having an upper end attached to a grate system, a pair of lateral spill shields and a rear spill shield, and the top box section having a lower end attached to a funnel assembly;

the funnel assembly comprising a top section and a constrained lower section, the constrained lower section comprising a plurality of inside angled lower edges all terminating within a section of an angled hopper pipe;

the angled hopper pipe set at an angle of between 10 to 40 degrees from horizontal and the angled hopper pipe having a first end attached to a clean out assembly, the clean out assembly comprising a main pipe, a clean out pipe with the clean out pipe attached to a cap;

the main pipe expelling gravel used to construct a gravel bar.

* * * * *